United States Patent
Li et al.

(10) Patent No.: US 9,930,476 B2
(45) Date of Patent: Mar. 27, 2018

(54) METHODS AND APPARATUSES FOR PROVIDING CONTENT DATA AND ACCESSING CONTENT DATA

(71) Applicant: Provenance Asset Group LLC, Essex, CT (US)

(72) Inventors: Zexian Li, Espoo (FI); Jan-Erik Ekberg, Vantaa (FI); Mikko Uusitalo, Helsinki (FI)

(73) Assignee: Provenance Asset Group LLC, Essex, CT (US)

( * ) Notice: Subject to any disclaimer, the term of this patent is extended or adjusted under 35 U.S.C. 154(b) by 0 days.

(21) Appl. No.: 15/035,322

(22) PCT Filed: Nov. 18, 2013

(86) PCT No.: PCT/CN2013/087312
§ 371 (c)(1),
(2) Date: May 9, 2016

(87) PCT Pub. No.: WO2015/070454
PCT Pub. Date: May 21, 2015

(65) Prior Publication Data
US 2016/0277876 A1    Sep. 22, 2016

(51) Int. Cl.
*H04W 4/00*    (2018.01)
*H04W 76/02*    (2009.01)
(Continued)

(52) U.S. Cl.
CPC ......... *H04W 4/008* (2013.01); *H04L 67/2814* (2013.01); *H04W 4/025* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,831,199 B2* | 11/2010 | Ng | H04L 67/06 455/3.01 |
| 2005/0286546 A1* | 12/2005 | Bassoli | G11B 27/002 370/432 |

(Continued)

FOREIGN PATENT DOCUMENTS

| | | |
|---|---|---|
| CN | 102792759 | 11/2012 |
| CN | 103139764 | 6/2013 |

(Continued)

OTHER PUBLICATIONS

International Search Report and Written Opinion received for corresponding Patent Cooperation Treaty Application No. PCT/CN2013/087312, dated Aug. 20, 2014, 12 pages.

(Continued)

*Primary Examiner* — Cindy Trandai
(74) *Attorney, Agent, or Firm* — Dinsmore & Shohl LLP (57) ABSTRACT

Embodiments of the present invention provide methods and apparatuses of providing content data and accessing content data. The method for providing content data comprises: receiving a first request for content data, the first request being originated from a first user equipment and comprising an indication of the requested content data and an indication from where the requested content data is accessible; identifying a local equipment that is in proximity to the first user equipment and has pre-stored the requested content data; and returning a first response directed to the first user equipment, by which the first user equipment is informed to access the requested content data from the local equipment via a first device-to-device communication with the local equipment. With the proposed solutions, network loads can be reduced.

18 Claims, 5 Drawing Sheets

(51) Int. Cl.
- *H04W 28/14* (2009.01)
- *H04W 4/02* (2018.01)
- *H04W 4/08* (2009.01)
- *H04W 88/04* (2009.01)
- *H04L 29/08* (2006.01)

(52) U.S. Cl.
CPC ............. *H04W 4/08* (2013.01); *H04W 28/14* (2013.01); *H04W 76/023* (2013.01); *H04L 67/1063* (2013.01); *H04W 88/04* (2013.01)

(56) References Cited

U.S. PATENT DOCUMENTS

| | | | |
|---|---|---|---|
| 2007/0030824 A1* | 2/2007 | Ribaudo | G01S 5/0018 370/328 |
| 2008/0301149 A1* | 12/2008 | Malcolm | G06F 17/30035 |
| 2011/0065424 A1* | 3/2011 | Estevez | H04W 48/18 455/414.3 |
| 2011/0225421 A1* | 9/2011 | Han | H04L 9/0897 713/159 |
| 2012/0215851 A1* | 8/2012 | Wu | H04L 67/104 709/205 |
| 2013/0054697 A1* | 2/2013 | Cha | H04N 21/2347 709/204 |
| 2013/0070745 A1* | 3/2013 | Nixon | H04L 45/74 370/338 |
| 2013/0103850 A1 | 4/2013 | Kohli et al. | |
| 2013/0159407 A1 | 6/2013 | Koskela et al. | |
| 2013/0188598 A1 | 7/2013 | Zakrzewski et al. | |
| 2013/0324169 A1* | 12/2013 | Kamal | H04W 4/008 455/466 |
| 2014/0022986 A1* | 1/2014 | Wu | H04W 48/16 370/328 |
| 2014/0068719 A1* | 3/2014 | Kiukkonen | H04W 12/08 726/4 |
| 2014/0335875 A1* | 11/2014 | Li | H04W 8/005 455/450 |

FOREIGN PATENT DOCUMENTS

| | | |
|---|---|---|
| EP | 2 432 187 | 3/2012 |
| WO | WO 2010/017308 | 2/2010 |
| WO | 2012152224 | 11/2012 |
| WO | 2013038056 | 3/2013 |

OTHER PUBLICATIONS

Bao, X. et al., *DataSpotting: Exploiting Naturally Clustered Mobile Devices to Offload Cellular Traffic* [online][retrieved May 2, 2017]. Retrieved from the Internet: <URL: http://mslab.kaist.ac.kr/wikipages/files/infocom2013_dataspotting.pdf>. (2013) 5 pages.

Malandrino, Francesco, *Content Sharing in Mobile Networks with Infrastructure: Planning and Management*, [online] [retrieved May 2, 2017]. Retrieved from the Internet: <URL: http://porto.polito.it/2502270/1/thesis-malandrino.pdf>. (2011) 132 pages.

* cited by examiner

METHODS AND APPARATUSES FOR PROVIDING CONTENT DATA AND ACCESSING CONTENT DATA

RELATED APPLICATION

This application was originally filed as PCT Application No. PCT/CN2013/087312 filed Nov. 18, 2013.

FIELD OF THE INVENTION

Embodiments of the present invention generally relate to wireless communications, and more particularly to methods, apparatuses, computer-readable storage mediums and computer program products for providing content data and accessing content data.

BACKGROUND OF THE INVENTION

As more and more users are equipped with smart devices, including smart phones, tablets etc., access to the Internet for gaining information and services has become convenient. As such, evolved mobile communications networks such as the Long Term Evolution (LTE) standards are being developed in order to incorporate features which can facilitate connection to the Internet and transmission of content data to mobile communications terminals wirelessly. The content data may be any type of data which is providing services to a user. For example, the content data may be streams audio or video content or a web page, but these are just examples. Therefore, the term "content data" should not be limited to a particular type of data but is generally used to infer higher layer user data.

Nowadays, it is very common that when users are taking public transportation, they would like to access the Internet for gaining the same content data or the content data from the same content provider with their respective mobile communication terminals. Especially, during rush hours, the number of the users accessing the same content data such as streaming video data at the same time would be significantly large. According to the current implementation in e.g. LTE, in this case, all the relevant mobile communication terminals within the public transportation (e.g. bus) will establish its respective evolved packet service (EPS) bearer to obtain the content data from a content provider, imposing a heavy load to the network.

However, considering the commonalities among multiple users, it is really an inefficient way to have multiple EPS bearers transmit the same or similar content data from the same content provider, which can result in unnecessary heavy loads to the network. Therefore, there is a need to find an efficient way to provide content data to user equipments.

SUMMARY OF THE INVENTION

The following presents a simplified summary of the present invention in order to provide a basic understanding of some aspects of the present invention. It should be noted that this summary is not an extensive overview of the present invention and that it is not intended to identify key/critical elements of the present invention or to delineate the scope of the present invention. Its sole purpose is to present some concepts of the present invention in a simplified form as a prelude to the more detailed description that is presented later.

In order to mitigate or alleviate at least one of the potential problems as discussed before, embodiments of the present invention provide an efficient way of providing content data to user equipments and accessing content data by user equipments so as to reduce network loads.

According to a first aspect of embodiments of the present invention, there is provided a method for providing content data to user equipments. The method comprises: receiving a first request for content data, the first request being originated from a first user equipment and comprising an indication of the requested content data and an indication of a content server from which the requested content data is accessible; identifying a local equipment that is in proximity to the first user equipment and has pre-stored the requested content data locally; and returning a first response directed to the first user equipment, by which the first user equipment is informed to access the requested content data from the local equipment via a first local communication, for example, device-to-device (D2D) communication, based on LTE or other radio technologies for example Wi-Fi or the like with the local equipment.

In an exemplary embodiment, the first response comprises a network address of the local equipment.

In an exemplary embodiment, the first response further comprises an address where the requested content data has been pre-stored within or in association with the local equipment.

In an exemplary embodiment, the method further comprises: receiving a second request for the content data, the second request being originated from a second user equipment and comprising the indication of the requested content data and the indication of the content server from where the requested content data is accessible; determining that the local equipment is in proximity to the second user equipment; and returning a second response directed to the second user equipment, by which the second user equipment is informed to access the requested content data from the local equipment via one of the first device-to-device communication and a second device-to-device communication with the local equipment.

In an exemplary embodiment, the first device-to-device communication comprises a communication via one of below bearers: i) a unicast communication bearer; ii) a group cast or multicast communication bearer; and iii) a broadcast communication bearer.

In an exemplary embodiment, identifying a local equipment comprises: identifying a location of the first user equipment; determining, based on the location of the first user equipment, a local equipment from a plurality of local equipments which is in proximity to the first user equipment; comparing the requested content data with content data pre-stored in the determined user equipment; and in response to the requested content data matching the content data pre-stored in the determined user equipment, determining the determined user equipment as the local equipment.

In an exemplary embodiment, comparing the requested content data with content data pre-stored in the determined user equipment comprises: obtaining, from a content provider, a list comprising entries which associate the plurality of local equipments with content data pre-stored therein; searching the list for the determined user equipment; and comparing the requested content data with content data associated with the determined user equipment.

According to a second aspect of embodiments of the present invention, there is provided a method for providing content data to user equipments. The method comprises: pre-storing at a local equipment, content data downloaded from a content server; receiving a first request for the content data, the first request being originated from a first user equipment which is in proximity to the local equipment and comprising an indication of the requested content data; and in response to the first request, communicating the requested content data to the first user equipment via a first device-to-device communication with the first user equipment.

In an exemplary embodiment, the first request comprises a network address of the local equipment.

In an exemplary embodiment, the first request further comprises an address where the requested content data has been pre-stored within or in association with the local equipment.

In an exemplary embodiment, the method further comprises: receiving a second request for the content data, the second request being originated from a second user equipment which is in proximity to the local equipment and comprising an indication of the requested content data; and in response to the second request, communicating the requested content data to the second user equipment via one of the first device-to-device communication and a second device-to-device communication with the second user equipment.

In an exemplary embodiment, the method further comprises establishing one of below bearers for the first device-to-device communication: i) a unicast communication bearer; ii) a group cast or multicast communication bearer; and iii) a broadcast communication bearer.

According to a third aspect of embodiments of the present invention, there is provided a method for accessing content data. The method comprises transmitting, at a first user equipment, a first request for content data, the first request comprising an indication of the requested content data and an indication of a content server from which the requested content data is accessible; receiving a first response to the first request, by which the first user equipment is informed to access the requested content data from a local equipment via a first device-to-device communication with the local equipment, the local equipment being in proximity to the first user equipment and having pre-stored the requested content data; and accessing the requested content data from the local equipment via the first device-to-device communication; wherein the local equipment has pre-stored the requested content data locally.

In an exemplary embodiment, the first response comprises a network address of the local equipment.

In an exemplary embodiment, the first response further comprises an address where the requested content data has been pre-stored within or in association with the local equipment.

In an exemplary embodiment, the method further comprises establishing one of below bearers for the first device-to-device communication: i) a unicast communication bearer; ii) a group cast or multicast communication bearer; and iii) a broadcast communication bearer.

According to a fourth aspect of embodiments of the present invention, there is provided an apparatus for providing content data to user equipments. The apparatus comprises at least one processor and at least one memory including computer program codes. The at least one memory and the computer program codes are configured to, with the at least one processor, cause the apparatus at least to: receive a first request for content data, the first request being originated from a first user equipment and comprising an indication of the requested content data and an indication of a content server from which the requested content data is accessible; identify a local equipment that is in proximity to the first user equipment and has pre-stored the requested content data locally; and return a first response directed to the first user equipment, by which the first user equipment is informed to access the requested content data from the local equipment via a first device-to-device communication with the local equipment.

According to a fifth aspect of embodiments of the present invention, there is provided an apparatus for providing content data to user equipments. The apparatus comprises at least one processor and at least one memory including computer program code. The at least one memory and the computer program code are configured to, with the at least one processor, cause the apparatus at least to: pre-store, at a local equipment, content data downloaded from a content server; receive a first request for the content data, the first request being originated from a first user equipment which is in proximity to the local equipment and comprising an indication of the requested content data; and in response to the first request, communicate the requested content data to the first user equipment via a first device-to-device communication with the first user equipment.

According to a sixth aspect of embodiments of the present invention, there is provided an apparatus for accessing content data. The apparatus comprises at least one processor and at least one memory including computer program code. The at least one memory and the computer program code are configured to, with the at least one processor, cause the apparatus at least to: transmit, at a first user equipment, a first request for content data, the first request comprising an indication of the requested content data and an indication of a content server from which the requested content data is accessible; receive a first response to the first request, by which the first user equipment is informed to access the requested content data from a local equipment via a first device-to-device communication with the local equipment, the local equipment being in proximity to the first user equipment and having pre-stored the requested content data; and access the requested content data from the local equipment via the first device-to-device communication; wherein the local equipment has pre-stored the requested content data locally.

By employing the proposed solutions, better (for example, faster, less delay) services would be provided for end users, burdens on network infrastructures are reduced, and more efficient spectrum usage due to local reuse of spectrum for D2D is enabled.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, wherein.

DETAILED DESCRIPTION OF EMBODIMENTS

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention will now be described with reference to an implementation which uses a mobile communications network operating in accordance with the 3GPP LTE standard. In the following description, LTE/SAE terminology and names are used. However, embodiments of the present invention can be applied to other mobile communications systems such as UMTS and GERAN with the GPRS core network.

In a context of the present disclosure, a user equipment (UE) may refer to a communication terminal, a Mobile Terminal (MT), a Subscriber Station (SS), a Portable Subscriber Station (PSS), a Mobile Station (MS), or an Access Terminal (AT), and some or all of the functions of the UE, the communication terminal, the MT, the SS, the PSS, the MS, or the AT may be included.

Furthermore, in a context of the present disclosure, a base station (BS) may represent, e.g., a node B (NodeB or NB), an evolved NodeB (eNodeB or eNB), a relay, a low power node such as a femto, a pico, and so on.

Figure 1:
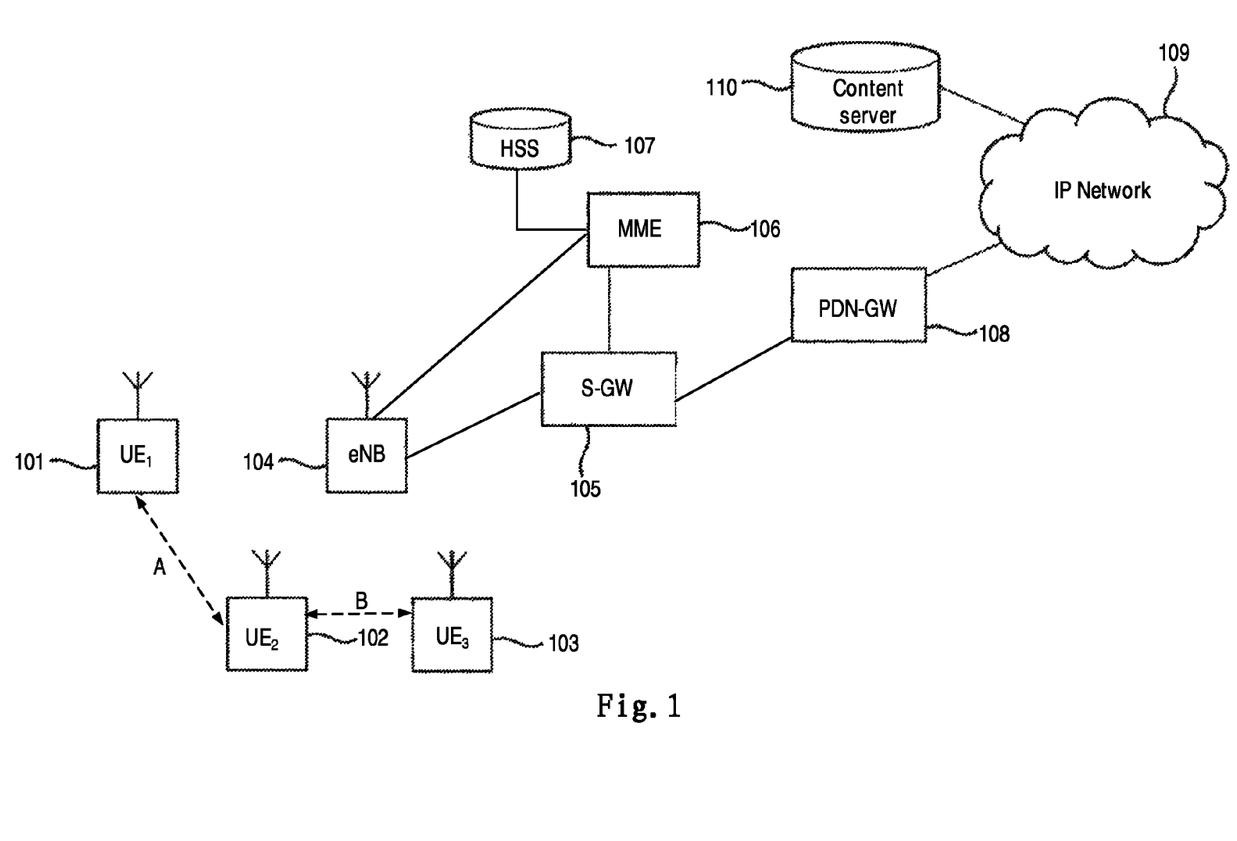
FIG. 1 illustrates a schematic block diagram of a communication network which is applicable to implement the embodiments of the present invention.

First, reference is made to FIG. 1, which illustrates an exemplary architecture of an LTE network which is applicable to implement the embodiments of the present invention. As shown in FIG. 1 and as with a conventional mobile communications network, UEs 101, 102 and 103 are arranged to communicate data to and from a base station 104 which are referred to in LTE as an enhanced NodeB (eNB). Moreover, UEs 101 and 102 are configured to communicate with each other by using a local or direct path as illustrated by a dashed arrow A where they are in proximity to each other. Similarly, UEs 103 and 102 are configured to communicate with each other by using a local or direct path as illustrated by a dashed arrow B where they are in proximity to each other. That is, UEs 101, 102 and 103 are configured to support a direct D2D communication. The base station or eNB 104 is connected to a serving gateway (S-GW) 105 which is arranged to perform routing of data packets and management of mobile communications services for communicating the data packets to the UEs 101-103 and the management of mobility by the MME as the UEs roam throughout the mobile communications network. To this is end, an interface is provided between the MME and the eNB 104. In order to maintain mobility management and connectivity, a mobility management entity (MME) 106 manages the enhanced packet service (EPS) connections with the UEs 101-103 using subscriber information stored in a home subscriber server (HSS) 107. Also connected to the S-GW 105 is a packet data network gateway (PDN-GW) 108 which forms an interface between the mobile communications network and an internet protocol (IP) network 109. A content server 110 is connected to the IP network 109. The UEs 101, 102 and 103 can establish its respective evolved packet service (EPS) bearer via the eNB 104, the S-GW 105 and the PDN-GW 108 so as to access content dada in the content server 110.

Figure 2:
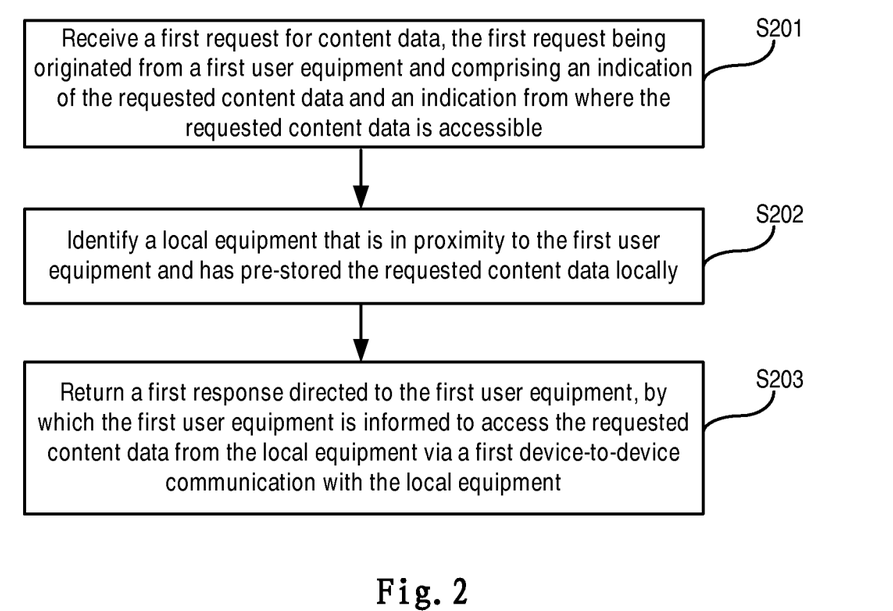
FIG. 2 illustrates a flowchart of a method for providing content data to user equipments according to a first aspect of embodiments of the present invention.

FIG. 2 illustrates a flowchart of a method 200 of providing content data to user equipments according to embodiments of the present invention. In accordance with embodiments of the present invention, the method 200 may be carried out by, for example, a S-GW (for example, the S-GW 105 in FIG. 1), a PDN-GW (for example, the PDN-GW 108 in FIG. 1), a location server or any other suitable network entity on the network side in a wireless commutation system such as a LTE system.

In step S201, a first request for content data is received. The first request is originated from a first user equipment, for example, the UE 101 in FIG. 1. The first request comprises an indication of the requested content data, such as an ID or name of the requested content data, and an indication from where the requested content data is accessible. The indication from where the requested content data is accessible comprises an indication of a content server from which the requested content data is accessible, such as the URL of the requested content data. In addition, the first request may also comprise quality of service (QoS) requirements on both cellular service and D2D service of the first user equipment and other user equipments.

In step S202, there is identified a local equipment which is in proximity to the first user equipment and has pre-stored the requested content data locally. The local equipment, for example, the UE 102 in FIG. 1, is configured to have a large storage capacity to pre-store content data from content providers. Public transportation such as buses, trains, subways, trams, boats and the like can be equipped with or carry the local equipment. The local equipment may download content data from the content servers at any suitable time such as non-rush hours. For example, the following two solutions may be employed to determine which content data can be downloaded by the local equipment beforehand.

Solution 1

Information on the requests for content data originated from user equipments would be collected by a central server maintained by, for example content providers or service providers. The central server would use some algorithms such as machine learning to learn patterns in these requests.

Based on these learned patters, the central server would determine what kinds of content data would be likely to be needed by users that take a specific public transportation such as bus, subway etc., at specific time periods such as rush hours every morning. Thus, public transportation companies can be informed of the information on the determined content data, thereby controlling their public transportation equipped with the local equipment to download the determined content data from the content servers at any suitable time.

Solution 2

As an alternative of Solution 1, the content providers or service providers may make a deal with the public transportation companies to give their privilege to certain selected content data and push the selected content data to the local equipments equipped within their public transportation at specific times. In this case, the information on the available content data could be advertised in the public transportation so as to facilitate the users' accesses to the content data from the local equipments. And the information on the available content data could be advertised in the Solution 1 as well.

As such, when users of the first user equipment take a public transportation equipped with or carrying the local equipment, the local equipment can provide local services to the first user equipment via a direct D2D communication therebetween.

In an embodiment, the following steps are performed to identify the local equipment.

First, a location of the first user equipment is identified. For example, the location of the first user equipment can be identified with a Global Position System, a triangulation location, or any suitable manners as appreciated by those skilled in the art. In the case of the Global Position System, the location of the first user equipment can be carried in the first request. Alternatively, if it is detected the first user equipment and the local equipment handover from the same cell to another cell at the same time, it can be determined the first user equipment is in proximity to the local equipment.

Then, there is determined, based on the location of the first user equipment, a local equipment from a plurality of local equipments which is in proximity to the first user equipment. Next, the requested content data is compared with content data pre-stored in the determined user equipment. Thereafter, if the requested content data matches the content data pre-stored in the determined user equipment, the determined user equipment is determined as the local equipment.

In comparing the requested content data with the content data pre-stored in the determined user equipment, there may be obtained, from a content provider, a list comprising entries which associate the plurality of local equipments with the content data pre-stored therein, the list is searched for the determined user equipment, and the requested content data is compared with the content data associated with the determined user equipment.

In another embodiment, the following steps are performed to identify the local equipment.

First, a list is obtained from a content provider. The list comprises entries which associate a plurality of local equipments with content data pre-stored therein. Then, the list is searched for the requested content data. Next, a location of the first user equipment is identified. Thereafter, there is determined, based on the location of the first user equipment, whether one or more local equipments of the plurality of local equipments associated with the searched content data are in proximity to the first user equipment. Then, one local equipment which is in proximity to the first user equipment is identified as the local equipment to provide the content.

With continued reference to FIG. 2, in step S203, there is returned a first response directed to the first user equipment, by which the first user equipment is informed to access the requested content data from the local equipment via a first device-to-device communication with the local equipment. In an embodiment, the first response comprises a network address of the local equipment. In another embodiment, the first response further comprises an address where the requested content data has been pre-stored within or in association with the local equipment. As appreciated by those skilled in the art, the first response may be returned via a higher layer (for example, an application layer, a network layer) signaling or lower layer signaling (for example MAC layer).

Thus, upon receiving the first response, the first user equipment may establish a device-to-device communication bearer with the local equipment so as to access the requested content data from the local equipment. Since the process of accessing the requested content data from the local equipment via a D2D communication bearer is well known by those skilled in the art, detailed description thereof is omitted.

As discussed above, it is common that when a plurality of users are taking public transportation, they would like to access, with their respective UEs, the same content data at the same time. For example, the users of the first user equipment (for example, UE 101 in FIG. 1) and a second user equipment (for example, UE 103 in FIG. 1) would like to access, with their respective UEs 101 and 103, the same content data at the same time when they are taking the same subway. In this case, besides the first request for the content data originating from the UE 101, there is received a second request for the content data, the second request being originated from the UE 103 and comprising the indication of the requested content data and the indication of the content server from where the requested content data is accessible. Then, there is determined that the local equipment (for example, the UE 102) is in proximity to the UE 103. Next, there is returned a second response directed to the UE 103, by which the UE 103 is informed to access the requested content data from the local equipment via one of the first device-to-device communication and a second device-to-device communication with the local equipment.

According to embodiments of the present invention, the first device-to-device communication comprises a communication via one of below bearers: i) a unicast communication bearer; ii) a groupcast or multicast communication bearer; and iii) a broadcast communication bearer.

Thus, with the solution of the present invention, when a user takes the public transportation equipped with the local equipment, if the user would like to access the content data from the content server and the local equipment has pre-stored the requested content data, the user can access the content data from the local equipment without establishing the conventional EPS bearer. Further, in the case where a plurality of users taking the same public transportation would like to access the same content data at the same time, the content data can be communicated to UEs of the requesting users from the local equipment via a unicast communication bearer, or a groupcast or multicast communication bearer or a broadcast communication bearer. Therefore, the burden of the network can be reduced.

Figure 3:
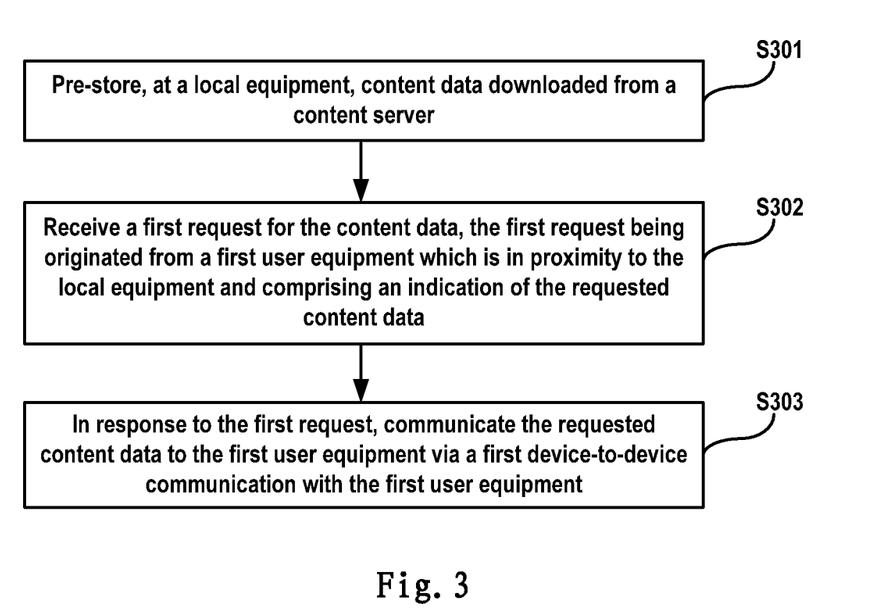
FIG. 3 illustrates a flowchart of a method for providing content data to user equipments according to a second aspect of embodiments of the present invention.

According to a second aspect of embodiments of the present invention, there is provided a method for providing content data to user equipments. Reference is now made to FIG. 3, which illustrates a flowchart of method 300 of providing content data to user equipments according to embodiments of the present invention. The method 300 may be carried out by, for example, a UE, a MT, a SS, a PSS, a MS, an AT or any other suitable device in a wireless commutation system such as a LTE system.

As shown in FIG. 3, in step S301, a local equipment pre-stores content data downloaded from a content server. Solution 1 and Solution 2 as described above may be employed to determine which content data can be downloaded by the local equipment beforehand.

Then, in step S302, there is received a first request for the content data, the first request being originated from a first user equipment which is in proximity to the local equipment and comprising an indication of the requested content data. In an embodiment, the first request comprises a network address of the local equipment. In another embodiment, the first request further comprises an address where the requested content data has been pre-stored within or in association with the local equipment.

Next, in response to the first request, the requested content data is communicated to the first user equipment via a first device-to-device communication with the first user equipment.

As discussed above, For example, the users of the first user equipment (for example, UE 101 in FIG. 1) and a second user equipment (for example, UE 103 in FIG. 1) would like to access, with their respective UEs 101 and 103, the same content data at the same time when they are taking the same subway. In this case, besides the first request for the content data originating from the UE 101, the local equipment receives a second request for the content data originated from the UE 103. The second request comprises the indication of the requested content data. Then, the local equipment communicates, in response to the second request, the requested content data to the UE 103 via one of the first device-to-device communication and a second device-to-device communication with the UE 103.

According to embodiments of the present invention, the first device-to-device communication comprises a communication via one of below bearers: i) a unicast communication bearer; ii) a groupcast or multicast communication bearer; and iii) a broadcast communication bearer.

Figure 4:
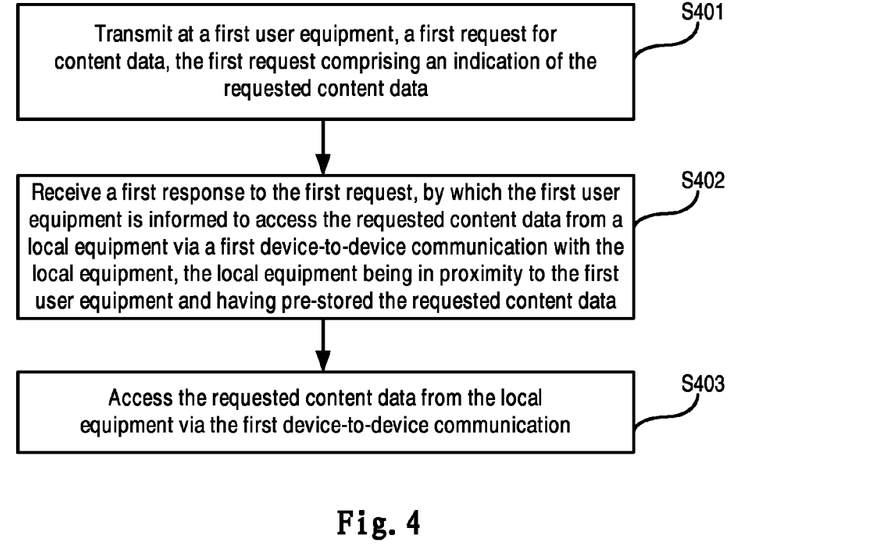
FIG. 4 illustrates a flowchart of a method for accessing content data according to a third aspect of embodiments of the present invention.

According to a third aspect of embodiments of the present invention, there is provided a method for accessing content data. Reference is now made to FIG. 4, which illustrates a flowchart of method 400 of accessing content data according to embodiments of the present invention. The method 400 may be carried out by, for example, a UE, a MT, a SS, a PSS, a MS, an AT or any other suitable device in a wireless commutation system such as a LTE system.

As shown in FIG. 4, in step S401, there is transmitted, at a first user equipment, a first request for content data, the first request comprising an indication of the requested content data. Then, in step S402, there is received a first response to the first request, by which the first user equipment is informed to access the requested content data from a local equipment via a first device-to-device communication with the local equipment, the local equipment being in proximity to the first user equipment and having pre-stored the requested content data. Next, in step S403, the requested content data is accessed from the local equipment via the first device-to-device communication, wherein the local equipment has pre-stored the requested content data locally.

In an embodiment, the first request further comprises an indication of a content server from which the requested content data is accessible and the first response is received from a network entity.

In an embodiment, the first response comprises a network address of the local equipment. In another embodiment, the first response further comprises an address where the requested content data has been pre-stored within or in association with the local equipment.

In an embodiment, the first request is broadcast by the first user equipment and the first response is received from the local equipment. According to this embodiment, the UE first checks whether the requested content data is available from a local equipment by broadcasting the first request comprising the indication of the requested content data. If the local equipments received the broadcast first request will check whether they have pre-stored the requested content data. If one of the local equipments has pre-stored the requested content data, it will return a first response to the first request so as to inform the first user equipment to access the requested content data from the one local equipment via a first device-to-device communication with the one local equipment. On the other hand, if no first response to the first request is received from the local equipments, the first user equipment will establish a conventional EPS bear to access the requested content data from, for example, a content server.

According to embodiments of the present invention, the first device-to-device communication is via one of below bearers: i) a unicast communication bearer; ii) a group cast or multicast communication bearer; and iii) a broadcast communication bearer.

Figure 5:
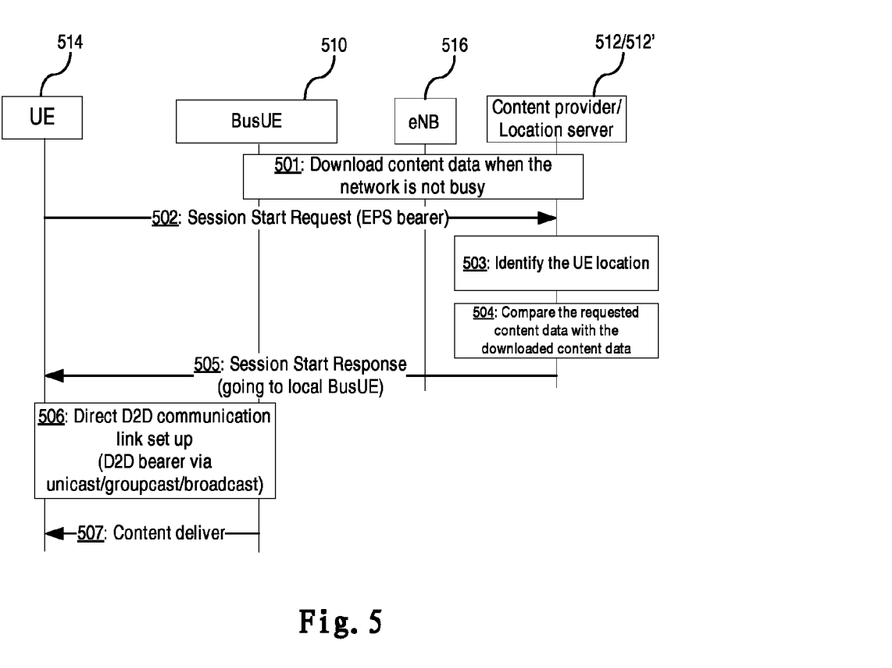
FIG. 5 illustrates an exemplary signaling diagram for a specific scenario according to embodiments of the present invention.

FIG. 5 illustrates an exemplary signaling diagram for a specific scenario according to embodiments of the present invention. In the scenario as shown in FIG. 5, a local equipment is equipped within a bus, and thus is refereed to as a BusUE 510. In step 501, the BusUE 510 downloads content data from a content server of a content provider 512 when the network is not busy, for example, at night or early in morning. In step 502, a UE 514 sends, via an eNB 516, a S-GW (not shown) and a PDN-GW (not shown), a Session Start Request for content data to the content server to establish an EPS bearer. Then, in step 503, in response to the request, a location server 512' identifies a location of UE and determines, based on the location of the UE 514, a local equipment (in this scenario, the BusUE 510) from a plurality of local equipments which is in proximity to the UE 514. Next, the content provider 512 compares the requested content data with content data downloaded (pre-stored) by the BusUE 510. For example, the content provider 512 may maintain a list comprising entries which associate the plurality of local equipments with content data downloaded by them. The content provider 512 may search the list for the BusUE 510, and compares the requested content data with the content data associated with the BusUE 510. If the requested content data matches the downloaded content data, the content provider 512 returns a Session Start Response in step 505, by which the UE 514 is informed to access the requested content data from the BusUE 510 via a D2D communication with the BusUE 510. Thereafter, in step 506, the UE 514 sets up a direct D2D communication link with the BusUE 510. The BusUE 510 may deliver the requested content data to the UE 514 via a unicast, groupcast or broadcast D2D communication bearer.

It should be noted that the order of steps 503 and 504 in FIG. 5 can be changed as well. That is, in an alternative embodiment, in step 503, in response to the request, the content provider 512 compares, the requested content data with content data downloaded (pre-stored) by a plurality of local equipments based on a list comprising entries which associate the plurality of local equipments with content data pre-stored therein, and determines one or more local equipments which have downloaded the requested content data. Then, in step 504, the location server 512' identifies a location of the UE 514, and determines, based on the location of the UE 514, one of the local equipments determined in step 503 which is in proximity to the UE 514 as the BusUE 510. Alternatively, both the steps 503 and 504 may be performed by the location server 512'. Specifically, the location server 512' obtains, from the content provider 512, a list comprising entries which associate a plurality of local equipments with content data pre-stored therein, searches the list for the requested content data, identifies a location of the UE 514, and determines, based on the location of the UE 514, one of the plurality of local equipments which is associated with the searched content data and in proximity to the first user equipment as the local equipment (the BusUE 510).

Figure 6:
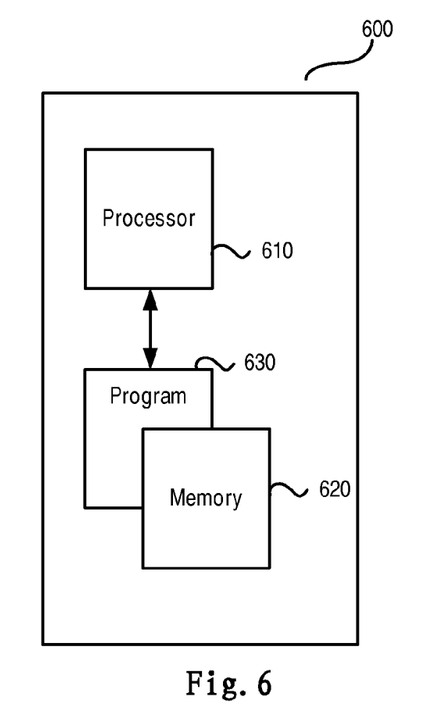
FIG. 6 illustrates a block diagram of an apparatus for providing content data to user equipments according to a fourth aspect of embodiments of the present invention.

According to a fourth aspect of embodiments of the present invention, there is provided an apparatus for providing content data to user equipments. Reference is now made to FIG. 6, which illustrates a block diagram of apparatus 600 of providing content data to user equipments according to embodiments of the present invention. The apparatus 600 may be implemented in, for example, a S-GW, a PDN-GW, a location server or any other suitable network entity on the network side in a wireless commutation system such as a LTE system.

As shown, the apparatus 600 may comprises at least one processor 610 and at least one memory 620 including computer program codes 630, wherein the at least one memory 620 and the computer program codes 630 are configured to, with the at least one processor 610, cause the apparatus at least to: receive a first request for content data, the first request being originated from a first user equipment and comprising an indication of the requested content data and an indication of a content server from which the requested content data is accessible; identify a local equipment that is in proximity to the first user equipment and has pre-stored the requested content data locally; and return a first response directed to the first user equipment, by which the first user equipment is informed to access the requested content data from the local equipment via a first device-to-device communication with the local equipment.

Figure 7:
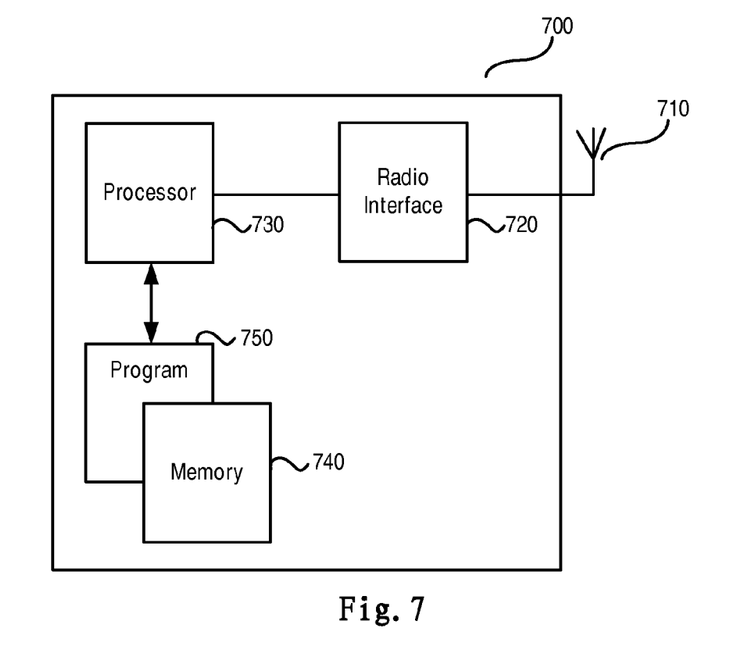
FIG. 7 illustrates a block diagram of an apparatus for providing content data to user equipments according to a fifth aspect of embodiments of the present invention.

According to a fifth aspect of embodiments of the present invention, there is provided an apparatus for providing content data to user equipments. Reference is now made to FIG. 7, which illustrates a block diagram of apparatus 700 of providing content data to user equipments according to embodiments of the present invention. The apparatus 700 may be implemented in, for example, a UE, a MT, a SS, a PSS, a MS, an AT or any other suitable device in a wireless commutation system such as a LTE system.

As shown in FIG. 7, the apparatus 700 comprises an antenna 710, a radio interface 720, at least one processor 730 and at least one memory 740 including computer program codes 750. The radio interface 720 may include other components, such as filters, converters (e.g., digital-to-analog converters and the like), symbol demappers, an Inverse Fast Fourier Transform (IFFT) module, and the like, to process symbols, such as OFDMA symbols, carried by a downlink or an uplink. The at least one memory 740 and the computer program codes 750 are configured to, with the at least one processor 730, cause the apparatus at least to: pre-store, at a local equipment, content data downloaded from a content server; receive a first request for the content data, the first request being originated from a first user equipment which is in proximity to the local equipment and comprising an indication of the requested content data; and in response to the first request, communicate the requested content data to the first user equipment via a first device-to-device communication with the first user equipment.

Figure 8:
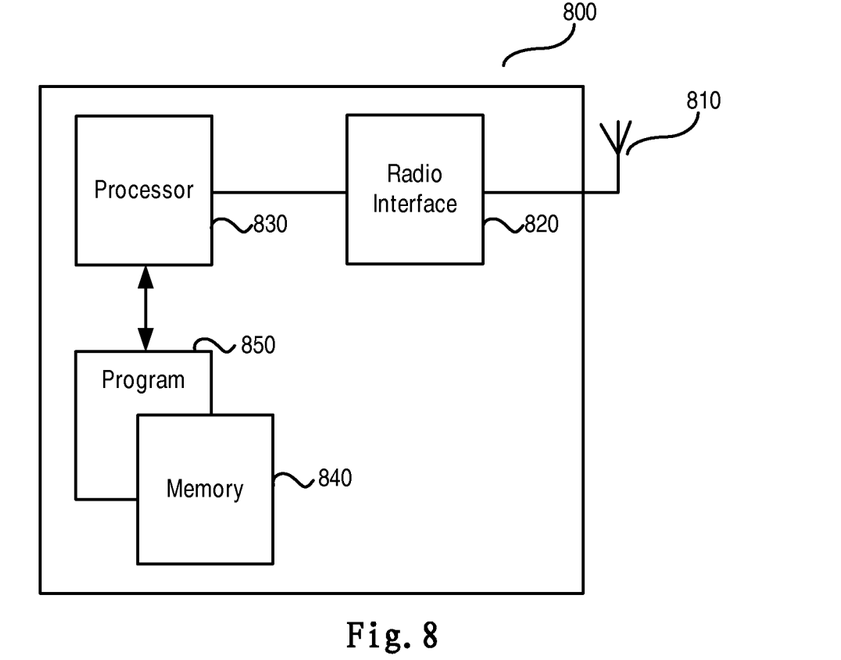
FIG. 8 illustrates a block diagram of an apparatus for accessing content data according to a sixth aspect of embodiments of the present invention.

According to a sixth aspect of embodiments of the present invention, there is provided an apparatus for accessing content data. Reference is now made to FIG. 8, which illustrates a block diagram of apparatus 800 of accessing content data according to embodiments of the present invention. The apparatus 800 may be implemented in, for example, a UE, a MT, a SS, a PSS, a MS, an AT or any other suitable device in a wireless commutation system such as a LTE system.

As shown in FIG. 8, the apparatus 800 comprises an antenna 810, a radio interface 820, at least one processor 830 and at least one memory 840 including computer program codes 850. The radio interface 820 may include other components, such as filters, converters (e.g., digital-to-analog converters and the like), symbol demappers, an Inverse Fast Fourier Transform (IFFT) module, and the like, to process symbols, such as OFDMA symbols, carried by a downlink or an uplink. The at least one memory 840 and the computer program codes 850 are configured to, with the at least one processor 830, cause the apparatus at least to: transmit, at a first user equipment, a first request for content data, the first request comprising an indication of the requested content data and an indication of a content server from which the requested content data is accessible; receive a first response to the first request, by which the first user equipment is informed to access the requested content data from a local equipment via a first device-to-device communication with the local equipment, the local equipment being in proximity to the first user equipment and having pre-stored the requested content data locally; and access the requested content data from the local equipment via the first device-to-device communication; wherein the local equipment has pre-stored the requested content data locally.

Embodiments of the present invention have also provided apparatuses comprising means for performing each step as illustrated in conjunction with FIGS. 2 to 4. Therefore, for detailed operations of respective units in these apparatuses, please refer to the previous descriptions of the methods of the present invention with reference to FIGS. 2 to 4.

The present invention also provided a computer-readable storage medium having computer program codes stored thereon, the computer program codes being configured to, when executed, cause an apparatus to perform steps in the methods as described hereinbefore. Further, there is provided a computer program product comprising a computer-readable storage medium as provided in the present invention.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. An apparatus for providing content data to user equipments, comprising:
at least one processor; and
at least one non-transitory memory including computer program codes,
wherein the at least one non-transitory memory and the computer program codes are configured to, with the at least one processor, cause the apparatus at least to:
receive a first request for content data, the first request being originated from a first user equipment and comprising an indication of the requested content data and an indication associated with a uniform resource locator of the requested content data from where the requested content data is accessible;
identify a local equipment that is in proximity to the first user equipment and has pre-stored the requested content data locally; and
return a first response directed to the first user equipment, by which the first user equipment is informed to access the requested content data from the local equipment via a first device-to-device communication with the local equipment, wherein the apparatus is caused to identify the local equipment by:
identifying a location of the first user equipment;
determining, based on the location of the first user equipment, equipment from a plurality of local equipment which is in proximity to the first user equipment;
comparing the requested content data with content data pre-stored in the determined equipment; and
in response to the requested content data matching the content data pre-stored in the determined equipment, determining the determined equipment to be the local equipment.

2. The apparatus according to claim 1, wherein the first response comprises a network address of the local equipment.

3. The apparatus according to claim 2, wherein the first response further comprises an address where the requested content data has been pre-stored within or in association with the local equipment.

4. The apparatus according to claim 1, wherein the at least one memory and the computer program code are further configured to, with the at least one processor, cause the apparatus to:
receive a second request for the content data, the second request being originated from a second user equipment and comprising the indication of the requested content data and the indication of the content server from where the requested content data is accessible;
determine that the local equipment is in proximity to the second user equipment; and
return a second response directed to the second user equipment, by which the second user equipment is informed to access the requested content data from the local equipment via one of the first device-to-device communication and a second device-to-device communication with the local equipment.

5. The apparatus according to claim 1, wherein the first device-to-device communication comprises a communication via one of below bearers:
i) a unicast communication bearer;
ii) a group cast or multicast communication bearer; and
iii) a broadcast communication bearer.

6. The apparatus according to claim 1, wherein comparing the requested content data with content data pre-stored in the determined user equipment comprises:
obtaining, from a content provider, a list comprising entries which associate the plurality of local equipments with content data pre-stored therein;
searching the list for the determined user equipment; and
comparing the requested content data with content data associated with the determined user equipment.

7. The apparatus according to claim 1, wherein identifying a local equipment comprises:
obtaining, from a content provider, a list comprising entries which associate a plurality of local equipments with content data pre-stored therein;
searching the list for the requested content data;
identifying a location of the first user equipment; and
determining, based on the location of the first user equipment, one of the plurality of local equipments which is associated with the searched content data and in proximity to the first user equipment as the local equipment.

8. An apparatus for providing content data to user equipments, comprising:
at least one processor; and at least one non-transitory memory including computer program code,
wherein the at least one non-transitory memory and the computer program code are configured to, with the at least one processor, cause the apparatus at least to:
pre-store, at a local equipment, content data downloaded from a content server;
receive a first request for the content data, the first request being originated from a first user equipment which is in proximity to the local equipment and comprising an indication of the requested content data and an indication associated with a uniform resource locator of the requested content data from where the requested content data is accessible, wherein the content data pre-stored at the local equipment matches the content data requested by the first user equipment; and
in response to the first request, communicate the requested content data to the first user equipment via a first device-to-device communication with the first user equipment.

9. The apparatus according to claim 8, wherein the first request comprises a network address of the local equipment.

10. The apparatus according to claim 9, wherein the first request further comprises an address where the requested content data has been pre-stored within or in association with the local equipment.

11. The apparatus according to claim 8, wherein the at least one memory and the computer program code are further configured to, with the at least one processor, cause the apparatus to:
receive a second request for the content data, the second request being originated from a second user equipment which is in proximity to the local equipment and comprising an indication of the requested content data; and
in response to the second request, communicate the requested content data to the second user equipment via one of the first device-to-device communication and a second device-to-device communication with the second user equipment.

12. The apparatus according to claim 8, wherein the at least one memory and the computer program code are further configured to, with the at least one processor, cause the apparatus to:
establish one of below bearers for the first device-to-device communication:
i) a unicast communication bearer;
ii) a group cast or multicast communication bearer; and
iii) a broadcast communication bearer.

13. An apparatus for accessing content data, comprising:
at least one processor; and
at least one non-transitory memory including computer program code,
wherein the at least one non-transitory memory and the computer program code are configured to, with the at least one processor, cause the apparatus at least to:
transmit, at a first user equipment, a first request for content data, the first request comprising an indication of the requested content data and an indication associated with a uniform resource locator of the requested content data from where the requested content data is accessible;
receive a first response to the first request, by which the first user equipment is informed to access the requested content data from a local equipment via a first device-to-device communication with the local equipment, the local equipment being in proximity to the first user equipment and having pre-stored the requested content data locally, wherein the content data pre-stored at the local equipment matches the content data requested by the first user equipment; and
access the requested content data from the local equipment via the first device-to-device communication; wherein the local equipment has pre-stored the requested content data locally.

14. The apparatus according to claim 13, wherein the first request further comprises an indication of a content server from which the requested content data is accessible; and
wherein the first response is received from a network entity.

15. The apparatus according to claim 14, wherein the first response comprises a network address of the local equipment.

16. The apparatus according to claim 15, wherein the first response further comprises an address where the requested content data has been pre-stored within or in association with the local equipment.

17. The apparatus according to claim 16, wherein the first request is broadcast by the first user equipment; and
wherein the first response is received from the local equipment.

18. The apparatus according to claim 13, wherein the at least one memory and the computer program code are further configured to, with the at least one processor, cause the apparatus to:
establish one of below bearers for the first device-to-device communication:
i) a unicast communication bearer;
ii) a group cast or multicast communication bearer; and
iii) a broadcast communication bearer.

* * * * *